US 12,555,175 B2

(12) United States Patent
Pedersen et al.

(10) Patent No.: US 12,555,175 B2
(45) Date of Patent: Feb. 17, 2026

(54) METHOD FOR EMBEDDING INFORMATION IN A DECORATIVE LABEL

(71) Applicant: LEGO A/S, Billund (DK)

(72) Inventors: Henrik Pedersen, Aarhus (DK); Karsten Østergaard Noe, Billund (DK); Oliver Gyldenberg Hjermitslev, Aalborg (DK); Søren Rasmussen, Mårslet (DK); Philip Kongsgaard Døssing, Billund (DK); Simon Oliver, Billund (DK); Rasmus Harr, Billund (DK); Mads Prahm, Billund (DK); Vladimir Ignatov, Billund (DK); Jesper Søderberg, Billund (DK)

(73) Assignee: LEGO A/S, Billund (DK)

( * ) Notice: Subject to any disclaimer, the term of this patent is extended or adjusted under 35 U.S.C. 154(b) by 582 days.

(21) Appl. No.: 17/922,714

(22) PCT Filed: May 5, 2021

(86) PCT No.: PCT/EP2021/061783
§ 371 (c)(1),
(2) Date: Nov. 1, 2022

(87) PCT Pub. No.: WO2021/224297
PCT Pub. Date: Nov. 11, 2021

(65) Prior Publication Data
US 2023/0306550 A1    Sep. 28, 2023

(30) Foreign Application Priority Data

May 6, 2020    (DK) .......................... PA 2020 70291

(51) Int. Cl.
*G06N 3/0455*    (2023.01)
*G06N 3/045*    (2023.01)
(Continued)

(52) U.S. Cl.
CPC .... *G06T 1/0064* (2013.01); *G06T 2201/0053* (2013.01)

(58) Field of Classification Search
CPC ........... G06T 1/0064; G06T 2201/0053; G06T 2201/0065; G06T 2201/0202; G06T 1/005; G06N 3/045; G06N 3/084
See application file for complete search history.

(56) References Cited

U.S. PATENT DOCUMENTS

| 2003/0037075 | A1* | 2/2003 | Hannigan | ................ G09B 5/06 |
| | | | | 715/201 |
| 2007/0109318 | A1* | 5/2007 | Tuomi | .................. G06T 11/203 |
| | | | | 345/611 |

(Continued)

FOREIGN PATENT DOCUMENTS

| CN | 110929772 | A | * | 3/2020 | ........... G06K 9/6256 |
| EP | 2749327 | A1 | | 7/2014 | |

(Continued)

OTHER PUBLICATIONS

Yang Liu, Mengxi Guo, Jian Zhang, Yuesheng Zhu, Xiaodong Xie; âA Novel Two-stage Separable Deep Learning Framework for Practical Blind Watermarkingâ; Oct. 2019 (Year: 2019).*

(Continued)

*Primary Examiner* — Andrew M Moyer
*Assistant Examiner* — Dylan John Mendez Muniz
(74) *Attorney, Agent, or Firm* — Day Pitney LLP; Anthony A. Kassas; Christopher J. Head

(57) ABSTRACT

A computer-implemented method for creating an encoder-decoder system for embedding information in a decorative label. The method includes defining a family of encoder functions and a family of decoder functions. Each encoder function of the family of encoder functions configured to encode information as a respective modification of a decorative label. Each decoder function of the family of decoder (Continued)

functions configured to decode an image of a modified decorative label into respective decoded information. The method includes applying an iterative optimization process to determine an optimized encoder-decoder pair. The optimized encoder-decoder air includes an optimized encoder function and an optimized decoder function. The optimized encoder function is selected by the iterative optimization process from the family of encoder functions and the optimized decoder function is selected by the iterative optimization process from the family of decoder functions.

16 Claims, 6 Drawing Sheets

(51) Int. Cl.
*G06N 3/0464* (2023.01)
*G06N 3/084* (2023.01)
*G06N 3/09* (2023.01)
*G06T 1/00* (2006.01)

(56) References Cited

U.S. PATENT DOCUMENTS

| | | |
|---|---|---|
| 2010/0029380 A1 | 2/2010 | Rhoads et al. |
| 2012/0295703 A1 | 11/2012 | Reiche et al. |
| 2014/0256430 A1 | 9/2014 | Matsumura |
| 2017/0286376 A1 | 10/2017 | Mugan |
| 2019/0043151 A1 | 2/2019 | Arce et al. |
| 2019/0087726 A1 | 3/2019 | Greenblatt et al. |
| 2021/0004930 A1* | 1/2021 | Kamath ............... G06T 11/203 |

FOREIGN PATENT DOCUMENTS

| | | |
|---|---|---|
| WO | 9743736 A1 | 11/1997 |
| WO | 2018069269 A1 | 4/2018 |
| WO | 2018212811 A1 | 11/2018 |
| WO | 2020007668 A1 | 1/2020 |

OTHER PUBLICATIONS

Victor Rodriguez Doncel, Nikos Nikolaidis, and Ioannis Pitas. "An optimal detector structure for the Fourier descriptors domain watermarking of 2D vector graphics." IEEE Transactions on Visualization and Computer Graphics 13.5 (2007): 851-863 (Year: 2007).*
Shichen, Soft rasterizer: A differentiable renderer for image-based 3d reasoning. Proceedings of the IEEE/CVF international conference on computer vision. 2019 (Year: 2019).*
Sonnet, Henry, et al. "Illustration watermarks for vector graphics." 11th Pacific Conference on Computer Graphics and Applications, 2003. IEEE, 2003 (Year: 2003).*
Kato, Hiroharu, Yoshitaka Ushiku, and Tatsuya Harada. "Neural 3d mesh renderer." Proceedings of the IEEE conference on computer vision and pattern recognition. 2018. (Year: 2018).*
First DK OA Search Report for Application No. PA 2020 70291 dated Nov. 18, 2020, 9 pages.
Kato Hiroharu et al.: "Neural 3D Mesh Renderer", 2018 IEEE/CVF Conference on Computer Vision and Pattern Recognition, IEEE, Jun. 18, 2018, pp. 3907-3916, XP033476362.
Yang Liu et al.: "A Novel Two-stage Separable Deep Learning Framework for Practical Blind Watermarking", Multimedia, ACM, Oct. 15, 2019, pp. 1509-1517, XP058442656.
International Search Report in corresponding International Application No. PCT/EP2021/061783, dated Aug. 4, 2021, 5 pages.
Written Opinion in corresponding International Application No. PCT/EP2021/061783, dated Jan. 2015, 7 pages.
EP Communication Under Rule 71(3) corresponding to Application No. 21724605.7, dated May 14, 2025, 59 pages.

* cited by examiner

METHOD FOR EMBEDDING INFORMATION IN A DECORATIVE LABEL

CROSS-REFERENCE TO RELATED APPLICATIONS

The present application is a U.S. National Stage Application of International Application No. PCT/EP2021/061783, filed on May 5, 2021 and published on Nov. 11, 2021 as WO 2021/224297 A1, which claims the benefit and priority of Danish Patent Application No. PA 202070291, filed on May 6, 2020, each of which is incorporated herein by reference in its entirety for any purpose whatsoever.

FIELD OF THE DISCLOSURE

The present disclosure relates to a method and a system for creating an encoder-decoder system for embedding information in a decorative label. The present disclosure further relates to uses of the encoder-decoder system for embedding information in a decorative label and for decoding such embedded information. The present disclosure further relates to systems implementing such methods and to a toy system employing such methods.

BACKGROUND OF THE DISCLOSURE

Different attempts of integrating physical objects into virtual game play or providing other forms of toy-enhanced computer-controlled activities or computer-supported physical gameplay have been made. However, it remains desirable to provide ways of linking the physical world and digital experiences, which may stimulate the interactive involvement of the user and provide entertaining game play.

Most toy-enhanced computer games or so-called toys-to-life systems currently involve systems wherein toys must have a physical component configured to communicate with a special reader via some form of wireless communication like RFID, NFC etc. Examples of such systems are disclosed in e.g. US 2012/0295703, EP 2749327 and US 2014/256430. It is generally desirable to provide toy systems that do not require the toy to comprise elements that are capable of communicating with a reader device so as to be able to identify a toy element, and to create its virtual digital representation and associate it with additional digital data.

Toys and other products are often provided with decorative labels. Attempts have been made to embed information into such a label in such a way that the information can be retrieved by employing computer vision technology. In this way, the embedded information may be extracted without the need of the toy or other product to be capable of transmitting the information.

WO 20181069269 describes a toy system including scannable tiles including visible, scannable codes printed on a token. The codes represent in-game powers and are represented as lines extending along the periphery of the top surface of the token. It would be desirable to increase the flexibility of creating different kinds of labels while still being able to reliably embed codes in the label.

US 20101029380 describes a method for operating an electronic gaming system. The system captures an image of a gaming object, extracts identifying information from the image of the gaming object, and uses the extracted identifying information to reference a database to determine a behavior associated with the identifying information. The method returns data to the gaming system to execute or control the behavior of the gaming system in response to the gaming object.

Nevertheless, it remains desirable to provide improved methods that allow the reliable embedding of information in a decorative label. In particular, it remains desirable to provide a method that allows reliable embedding of different information into different versions of the same decorative label, such that the information can be retrieved with a high degree of reliability and accuracy.

It is further desirable to provide a method that only affects the visual appearance of the decorative label in a limited way or at least such that the effect of the embedded information on the visual appearance of the label can be controlled and kept within desired limits. In particular, different applications may impose more or less strict requirements as to how much the visual appearance of the decorative label may be affected by the embedding of information. For example, in some applications, it may be desirable that the information may be embedded without affecting the visual appearance of the decorative label in a readily discernible manner, e.g. such that changes to the visual appearance are at best discernible upon detailed scrutiny but not at first sight. Other applications may allow visible variations of the decorative label.

It is further desirable to provide a method that is suitable for mass production. To this end, it is desirable that the method allows production and application of a certain decorative label, but with respective items of information embedded in it. Moreover, the manufacturing and application of the decorative labels should preferably be cost effective.

WO 2018/212811 discloses a process for hiding a secret M×M RGB pixel secret image in a cover image having N×N pixels. The secret image information is embedded in the individual bits of pixels of the cover image. Accordingly, hiding information in the noisy, high-frequency, filled regions of a cover image yields less humanly detectable perturbations than hiding in the flat regions. However, many decorative labels are relatively simple graphical patterns that include few noisy, high-frequency regions.

It is thus further desirable that information content may be embedded into decorative labels of varying size and graphical complexity. Preferably, the amount of information, e.g. the number of bits of information, embedded in a decorative label should preferably be scalable.

It is further desirable to provide a system that does not unduly limit the creative freedom of the creator of the decorative.

Hence, it is desirable to provide a system and methods for embedding information into a decorative label that at least to some extent fulfil one or more of the above needs and/or that fulfil other needs related with the embedding of information in decorative labels, e.g. within the toy industry.

SUMMARY

In accordance with one aspect, disclosed herein are embodiments of a computer-implemented method for creating an encoder-decoder system for embedding information in a decorative label, the method comprising:
   defining a family of encoder functions and a family of decoder functions, each encoder function of the family of encoder functions configured to encode information as a respective modification of a decorative label, each decoder function of the family of decoder functions configured to decode an image of a modified decorative label into respective decoded information, applying an iterative optimization process to determine an optimized encoder-decoder pair, the optimized encoder-decoder pair comprising an optimized encoder function and an optimized decoder function, the optimized encoder function selected by the iterative optimization process from the family of encoder functions and the optimized decoder function selected by the iterative optimization process from the family of decoder functions, the iterative optimization process being configured to determine the optimized encoder-decoder pair so as to at least approximately optimize a detection reliability of the optimized decoder function when decoding images of decorative labels that have been modified using the optimized encoder function;

wherein each encoder function of the family of encoder functions is configured to receive a vector graphics representation of the decorative label and to output a modification of the vector graphic representation, resulting in a modified vector graphic representation.

Accordingly, the encoder function and decoder function are optimized as a pair by an iterative optimization process performing an optimization of the encoder-decoder pair as a whole, i.e. an end-to-end optimization of the encoding and decoding process. As the encoder is based on vector graphics representation a high degree of flexibility is provided to the creator of the decorative label. The encoder function provides modifications for embedding the information by computing the modification responsive to the information to be embedded. Acceptable modifications to the decorative label may easily be controlled, e.g. by defining constraints of the allowed perturbations of the vector graphics parameters. Accordingly, a flexible, easily controllable, yet reliable encoding and decoding system is obtained.

In some embodiments, the family of decoder functions is a parametric family of decoder functions, i.e. a set of decoder functions parameterized by one or more parameters. The parametric family of decoder functions may thus be represented as a parametrized decoder function, parametrized by one or more adaptable decoder parameters. The individual decoder functions of the family of decoder functions are thus defined by respective parameter values of the one or more adaptable decoder parameters. In particular, the family of decoder functions may be a trainable decoder neural network, preferably a convolutional neural network, parametrized by a plurality of network weights. Accordingly, the optimized decoder function may be a trained decoder neural network, in particular as a trained convolutional neural network, wherein the network weights of the trained decoder neural network have been determined by a machine-learning training process based on a plurality of training examples. Generally, the term family of functions as used herein refers to a set of related functions. The term parametric family of functions (or simply parametrized function) as used herein refers to a set of functions whose differences depend only on the chosen values for a set of parameters. For example, a parametrized function $f$ of an input x which function is parametrized by a set of parameters p will be denoted $f(x; p)$.

Similarly, in some embodiments, the family of encoder functions is a parametric family of encoder functions, parametrized by one or more adaptable encoder parameters. The individual encoder functions of the family of encoder functions are thus defined by respective parameter values of the one or more adaptable encoder parameters. The optimized encoder function may be a trained encoder function, e.g. a trained encoder neural network, wherein the adaptable encoder parameters of the trained encoder function have been determined by a machine-learning training process based on a plurality of training examples, in particular by a common machine-learning process for at least partly concurrent training of the decoder function as well as of the encoder function, and based on a common set of training examples.

The iterative optimization process may thus comprise iteratively adapting the one or more decoder parameters, e.g. the network weights of the decoder neural network, and iteratively adapting the one or more encoder parameters. e.g. network weights of an encoder neural network, in particular during a single iterative optimization process. In particular, during at least some iterations of the iterative optimization process, the process may adapt one or more encoder parameters as well as one or more of the decoder parameters. Accordingly, an efficient optimization process is provided that results in a high degree of decoding reliability.

Optimizing the encoder-decoder pair, in particular training the encoder-decoder pair based on a set of training examples, may thus include iteratively adapting the adaptable parameters of the parametrized encoder function and iteratively adapting the plurality of weights of the convolutional neural network.

In embodiments where the optimized encoder-decoder pair is determined using a machine-learning process, the optimized encoder function and the optimized decoder function are optimized from the family of encoder functions and from the family of decoder functions, respectively, by a machine learning training process, based on a set of training examples. Each training example may include a training decorative label and training information to be embedded in the training decorative label. In particular, in such embodiments, the optimized encoder function and the optimized decoder functions are a trained encoder function and a trained decoder function, respectively, trained together as a pair by a machine learning process and based on a common set of training examples, common for the training of the encoder function and of the decoder function. Accordingly, a reliable encoder-decoder system may efficiently be created. In particular, an encoder system may even be customized for a particular decorative label or a group of decorative labels and/or customized to a particular type of information, e.g. to an amount of information, a variability of the information to be embedded and/or the like. Such customization may be performed without, or at least with little, a priori knowledge of the requirements imposed by the choice of decorative label and/or type of information to be embedded onto the details of the encoding and decoding process.

Accordingly, in accordance with one aspect, disclosed herein are embodiments of a method for creating an encoder-decoder system for embedding information in a decorative label, the method comprising:

defining a parametrized encoder-decoder pair, the parametrized encoder decoder pair comprising a parametrized encoder function and a parametrized decoder function, the parametrized encoder function being configured to encode information as a modification of a decorative label, the parametrized decoder function being configured to decode an image of a modified decorative label into decoded information, receiving a set of training examples, each training example including a training decorative label and training information to be embedded into the training decorative label, applying a machine learning process to train the parametrized encoder-decoder pair to obtain a trained encoder function and a trained decoder function, the machine learning process being configured to at least approximately optimize a detection reliability of the trained decoder function when decoding images of training decorative labels that have been modified using the trained encoder function.

In some embodiments, the iterative optimization process comprises a backpropagation process based on a set of training examples.

The iterative optimisation process may be based on a suitable objective function (which may also be referred to as a loss function), such as on an error measure indicative of a detection reliability, e.g. a measure of a difference between the training information and the decoded information, decoded by a current decoder function from an image of a modified decorative label, the modified decorative label having been modified by a modification computed by a current encoder function when the training information. The measure of difference may e.g. be expressed as a number of bit errors or in another suitable manner. Other examples of objective functions may include measures of other objectives of the encoder-decoder system, e.g. measures of robustness, transparency, etc. The objective function, e.g. the error measure, may e.g. be evaluated as an average over at least a subset of the set of training examples—or otherwise defined across at least a subset of the set of training examples. Responsive to the objective function, the encoder parameters and/or the decoder parameters are adapted so as to obtain an adapted encoder function and/or an adapted decoder function.

In some embodiments, the iterative optimization process comprises a first optimisation stage and a second optimisation stage, wherein, during the first optimisation stage, the encoder parameters are kept constant, and only the decoder parameters are adapted according to an optimisation update rule responsive to a suitable objective function, e.g. by applying the backpropagation algorithm. During the second optimization stage, the encoder parameters and the decoder parameters are adapted according to the same or a different optimisation update rule. In particular, the second optimization stage may be performed before or after the first optimisation stage. For example, the first optimization may be performed until a predetermined criteria is fulfilled, e.g. until a rate of improvement of the objective function decreases below a threshold. Responsive to the predetermined criteria being fulfilled, the process may initiate the second optimisation stage. Accordingly, a reliable encoder-decoder system may be obtained in a relatively short training time.

Generally, vector graphics are computer graphics images that are defined in terms of a set of geometrical primitive objects, such as points, lines, etc. The primitive objects are normally defined in terms of points on a plane, typically on a Cartesian plane, which are connected by lines and curves to form polygons and/or other geometric shapes. In some embodiments, in order to preserve the overall layout of the vector drawing, the modifications made by the encoder function are preferably constrained to be within bounds specified by a set of modification rules, which may e.g. be defined by the creator of the decorative label. Accordingly, in some embodiments, the encoder function may compute the modification responsive to one or more modification rules. To this end, some embodiments of the method described herein comprise receiving an encoder specification data structure indicative of one or more modification rules, each modification rule defining a type and/or magnitude of a modification to a decorative label, and wherein the encoder functions of the family of encoder functions are configured to only make modifications complying with the received encoder specification. Accordingly, the resulting optimized encoder function is also configured to only make modifications complying with the received encoder specification.

A modification rule may define a limit or other restriction imposed on the modifications allowed to be made by the encoder function. e.g. a maximum magnitude of a modification, a type of modification etc. In particular, when using a vector graphics representation of the decorative label as an input to the encoder function, possible modifications to a decorative label may be defined in a parametric manner and a convenient way of defining restrictions on the parametrized modifications is provided. The modification rules may be specific to a particular decorative label. They may define which modifications the encoder function may make to specific primitives of the vector graphics representation of the decorative label and within which limits. Examples of such modification rules may include an identification of a vector graphics primitive of the decorative label that may be modified by the encoder function. Examples of vector graphics primitives include lines, circles, polygons, etc. The modification rule may further define which modifications may be performed on the identified vector graphics primitive. In particular, a vector graphics primitive may have associated with it one or more properties, in particular one or more numerical properties, such as a position or orientation, that are represented as continuous variables. The modification rule may thus define a maximum modification, in particular a maximum absolute or relative modification, which the encoder function may make to said numerical property, i.e. to said continuous variable. For example, the modification rule may define a maximum displacement of one or both end points of a line, a maximum displacement of a center of a circle, a maximum scaling of a radius of a circle and/or the like. The modification rules may be defined by a user and provided as an input to the process for creating an encoder-decoder system together with a decorative label. Accordingly, a mechanism is provided that allows a designer of a decorative label to control, in particular to limit, the potentially visible impact the embedding of information in a decorative label may have. The process thus provides a mechanism allowing a user to control the desired level of concealment, e.g. so as to balance the acceptable modifications to the decorative label and the amount of information to be embedded.

As many processes for applying a decorative label, e.g. printing processes, are based on a raster representation of a decorative label, applying the modification to the decorative label during use of the optimized encoder may further comprise a rasterization of the modified vector graphics representation so as to obtain a raster representation of the modified decorative label. The raster representation of the decorative label may then be applied to an object, e.g. by printing and/or be processed by another suitable reproduction or distribution process. For the purpose of optimising the encoder and the decoder function, the iterative optimisation process also generates a rasterized image of the modified training decorative label, the rasterized image being used as an input for the decoder function during the optimization process. However, in order to facilitate the iterative optimization, the optimization process applies a smoothed approximation of the normal rasterization, i.e. of the rasterization which is to be used during normal use. In particular, the smoothed approximation may be a differentiable rasterization function while the normal rasterization does not need to be differentiable and typically indeed is non-differentiable. Here and in the following a differentiable rasterization refers to a rasterization of an image that is definable as a differentiable function of its input parameters, in particular of continuous variables defining variations to the parameters of geometric primitives of a vector graphics representation.

In particular, in some embodiments, the modification defined by the encoder function is a modification of the vector graphics representation of the decorative label; wherein applying the modification to a decorative label comprises a rasterization of the modified vector graphics representation resulting in a rasterized version of the modified vector graphics representation, and wherein the optimization process is configured to apply a differentiable approximation of said rasterization process resulting in a smoothed rasterized version of the modified vector graphics representation. Hence, while a differentiable approximation of a rasterization of the vector graphics is used for the purpose of creating the optimized encoder-decoder pair, during subsequent application of the optimized encoder-decoder pair in normal use, the modified vector graphics is rasterized using a rasterization that does not need to be differentiable and, in some embodiments, is non-differentiable.

The method of embedding information in a decorative label may be executed by a suitable programmed data processing system.

The present disclosure relates to different aspects including the methods described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, according to one aspect, disclosed herein are embodiments of a computer-implemented method of embedding information in a decorative label, the method comprising:
  receiving a decorative label and information to be embedded into the decorative label,
  using an optimized encoder function of an optimized encoder-decoder pair, obtained by the method of creating an encoder-decoder system as disclosed herein, to encode the information into a modification of the decorative label,
  applying the modification to the decorative label to obtain a modified decorative label.

Accordingly, embodiments of the method of embedding information in a decorative label may comprise:
  a) performing the acts of the method for creating an encoder-decoder system disclosed herein to obtain an optimized encoder function of an optimized encoder-decoder pair,
  b) receiving a decorative label and at least one item of information to be embedded into said decorative label,
  c) using the optimized encoder function to encode the received item of information as a modification of the received decorative label, and
  d) applying the modification to the received decorative label to obtain a modified decorative label.

As described in connection with the first aspect, the decorative label is in the form of a vector graphics representation of the decorative label. The modification may include one or more modifications of one or more geometric primitives of the vector graphics representation.

Also as described in connection with the first aspect, applying the modification may comprise applying a rasterization process, in particular a non-differentiable rasterization process to the modified vector graphics representation.

Some embodiments of the method of embedding information in a decorative label may receive a single decorative label and a plurality of items of information, each item of the plurality of item to be separately embedded into respective versions of the decorative label. The single decorative label may correspond, in particular be similar or even identical to, a training decorative label used during the creation of the optimised encoder-decoder pair. The method may thus comprise performing the steps b) through d) for each of the plurality of items of information so as to obtain a corresponding plurality of modified decorative labels, each modified decorative label of the plurality of modified decorative labels having a respective one of the plurality of items of information embedded in it.

Similarly, some embodiments of the method of embedding information in a decorative label may receive a plurality of decorative labels and information to be embedded into each of the plurality of decorative labels. Some or all of the decorative labels of the plurality of decorative labels may correspond, in particular be similar or even identical to, one or more of the training decorative label used during the creation of the optimised encoder-decoder pair. The method may thus comprise performing the steps b) through d) for each of the plurality of decorative labels so as to obtain a corresponding plurality of modified decorative labels, each modified decorative label of the plurality of modified decorative labels corresponding to a respective one of the plurality of received decorative labels and each modified decorative label of the plurality of modified decorative labels having the received information embedded in it.

It will be appreciated that some embodiments of the method of embedding information in a decorative label may be used to embed multiple items of information into multiple decorative labels, thus obtaining multiple modified decorative labels, each modified decorative label corresponding to a respective one of the decorative labels and having a respective one of the items of information embedded in it.

In some embodiments, the method for creating an encoder-decoder system disclosed herein may create an optimized encoder-decoder pair for a specific decorative label, while other embodiments may create an optimized encoder-decoder pair for a plurality of decorative labels. Accordingly, the set of training examples used for training an encoder-decoder pair may include a single training decorative label and a plurality of training items of information each to be embedded in the single training decorative label. To this end, when a label designers has designed a desired decorative label and, optionally, (manually or automatically) defined one or more modification rules associated with the designed decorative label, the method may create an optimized encoder-decoder system specifically for the designed decorative label and, optionally, for the defined modification rules. To this end, the training process may create a plurality of training items of information and train an optimized encoder-decoder pair using the designed decorative label and the created training examples. The training examples may be created as random bit strings, optionally fulfilling certain conditions matching the properties of the type of information intended to be embedded by the resulting encoder-decoder system. Examples of said conditions may e.g. include the number of bits to be embedded.

Alternatively, the set of training examples used for training an encoder-decoder pair may include a plurality of different training decorative labels and a plurality of training items of information, each training item of information to be embedded in one or more of the training decorative labels.

The method of embedding information in a decorative label may be executed by a suitable programmed data processing system.

The method of embedding information in a decorative label may comprise reproducing the modified decorative label in a user-perceptible manner, e.g. by applying the modified decorative label to an object, in particular to a visible surface of the object. In particular different modified decorative labels may be applied to respective objects, thus associating different items of information with respective objects.

Accordingly, according to one aspect, a process for manufacturing a labelled object may comprise:
 providing or receiving an object;
 performing the acts of the method for embedding information into a decorative label disclosed herein to obtain a modified decorative label, and
 applying the modified decorative label to the object.

Generally, modified decorative labels may be applied to objects by various means. In particular, a decorative label may be printed directly onto an object or it may be printed on a sticker or other suitable carrier that may be applied to the object, e.g. during manufacturing of the object or subsequently, e.g. by the user of the object.

The decorative label may be permanently attached to an object or removably attached to an object.

A variety of objects may be provided with decorative labels, in particular toy objects or other objects. The objects to which modified decorative labels may be manufactured by a variety of manufacturing methods known per se in the art and be made from various materials.

The decorative label may comprise graphical elements, text, images or other visible content. The decorative labels may be black-and-white drawings or otherwise only include a single color on a single background color, or the decorative label may be a multi-colored label including more than two colors.

Accordingly, the method for manufacturing a labelled object may be performed by a suitable labelling system, e.g. Including a suitably programmed data processing system, suitably programmed to embed information in a decorative label resulting in a modified decorative label, and an apparatus for applying the modified decorative label to an object or to otherwise reproduce or distribute the modified decorative label. The apparatus for applying the modified decorative label to an object may include a printer or another suitable apparatus.

According to yet another aspect, disclosed herein are embodiments of a computer-implemented method of detecting information embedded in a decorative label, in particular in a modified decorative label, modified by a process for embedding information in a decorative label as described herein, the method comprising:
 obtaining an image of a modified decorative label, in particular an image of an object having applied thereto a modified decorative label,
 applying an optimized decoder function of an optimized encoder-decoder pair, obtained by the method of creating an encoder-decoder system as disclosed herein, to decode the image of the modified decorative label into decoded information.

Accordingly, embodiments, of the method of detecting information embedded in a decorative label, in particular in a modified decorative label, modified by a process for embedding information in a decorative label as described herein, may comprise:
 A) performing the acts of the method for creating an encoder-decoder system disclosed herein to obtain an optimized decoder function of an optimized encoder-decoder pair,
 B) obtaining one or more images of respective modified decorative labels,
 C) applying the optimized decoder function to decode each of the obtained images of the respective modified decorative labels into respective decoded information.

The method of detecting information embedded in a decorative label may be performed by a suitable data processing system, e.g. by a suitably programmed computer or other data processing device, such as a tablet computer, a smartphone or another portable data processing device.

The process may obtain the one or more images in a variety of ways. For example, the process may receive the one or more images from another process or data processing system, e.g. via a computer network or other suitable data communications interface. Some embodiments of the method of detecting information embedded in a decorative label may include capturing the one or more images of respective modified decorative labels. To this end, the data processing system performing the method of detecting information embedded in a decorative label may comprise or be communicatively coupled to a suitable image capturing device, such as a digital camera. The captured images may include still images or video images.

One or more embodiments of the methods according to the various aspects described herein provide an image steganography method that embeds messages in decorative labels, in such a way that the message can be decoded from a captured photo of the embedded decorative label.

One or more embodiments of the methods and system described herein allow creatives, such as artists, designers, and illustrators, to create aesthetically pleasing alternatives to barcodes, while enabling them to invisibly transfer digital information via artistic imagery.

As mentioned above, embodiments of the method of creating an encoder-decoder system and/or embodiments of the method for embedding information in a decorative label and/or embodiments of the method of detecting information embedded in a decorative label may be performed by one or more suitably programmed data processing systems. Accordingly, according to yet another aspect, a data processing system is configured to perform the acts of the method according to one or more of the aspects described herein.

Here and in the following, the data processing system may comprise a stationary or portable computer, another type of portable processing device, a system comprising multiple computers and other suitable architectures of one or more devices including one or more processing unit.

For the purpose of the present description, the term "processing unit" Is intended to comprise any circuit and/or device suitably adapted to perform the functions described herein. In particular, the term processing unit comprises a general- or special-purpose programmable data processing unit, e.g. a microprocessor, such as a central processing unit (CPU) of a computer or of another data processing system, a digital signal processor (DSP), an application specific integrated circuits (ASIC), a programmable logic arrays (PLA), a field programmable gate array (FPGA), a special purpose electronic circuit, etc., or a combination thereof.

The processing unit may be integrated into a stationary or portable computer or into another type of portable processing device.

A computer or a portable processing device may further comprise an image capturing device and/or a display and/or another form of user-interface allowing a user to interact with the computer or processing device. It will be appreciated, however, that the data processing system may also be implemented as a client-server or a similar distributed system, e.g. such that the image capturing and other user interaction is performed by a client device, while at least some of the data processing tasks may be performed by a remote host system in communication with the client device.

According to another aspect, disclosed herein are embodiments of a computer program product, comprising program code configured, when executed by a data processing system, to cause the data processing system to perform the acts of one or more of the methods disclosed herein. The computer program may be embodied as a computer-readable medium having stored thereon the computer program. Accordingly, according to yet another aspect, disclosed herein is a computer program which may be encoded on a computer readable medium, such as a disk drive or other memory device. Examples of computer-readable media include non-transient media such as a CD-ROM, DVD, optical disc, memory card, flash memory, magnetic storage device, floppy disk, hard disk, etc. having stored thereon the computer program. In other embodiments, a computer program product may be provided as a downloadable software package, e.g. on a web server for download over the internet or other computer or communication network, or as an application for download to a mobile device from an App store.

According to yet another aspect, disclosed herein are embodiments of a toy system. The toy system may comprise a toy, an image capturing device and a processing unit. The toy includes a decorative label having embedded therein information embedded using an optimized encoder function of an optimized encoder-decoder pair obtained by the method of creating an encoder-decoder system as disclosed herein. The image capturing device may be operable to capture one or more images of the toy. The processing unit may be configured to process the captured image or an otherwise obtained image of the toy to decode the information embedded in the decorative label using an optimized decoder of the optimized encoder-decoder pair and to control a virtual and/or physical play experience responsive to the decoded information. Manufacturing such a toy may thus comprise, manufacturing a base toy, creating a base decorative label, embedding information into the base decorative label; and applying a modified decorative label to the base toy, wherein embedding comprises performing the acts of the method for embedding information in a decorative label described herein. Manufacturing the toy may further comprise creating an optimized decoder associated with an optimized encoder used for embedding the information in the decorative label, in particular by performing the acts of the method for creating an encoder-decoder system disclosed herein. The manufactured toy having the modified label applied to it and the optimized decoder may then be provided to a user of the toy, either as a kit or through different distribution channels. For example, the toy may be provided as a kit of parts including the toy and instructions for obtaining the optimized decoder, e.g. by downloading the optimized decoder from a website, from an Appstore, and/or the like.

In some embodiments, the toy system is a toy construction system comprising a plurality of toy construction elements, wherein at least a labelled toy construction element of the plurality of toy construction elements includes a modified decorative label having embedded therein information embedded using an optimized encoder function of an optimized encoder-decoder pair obtained by the method for creating an encoder-decoder system disclosed herein. The image capturing device may be operable to capture one or more images of a toy construction model constructed from the toy construction elements, including the labelled toy construction element.

The processing unit may be configured to process the captured image—or an otherwise obtained image of a toy construction model including the labelled toy construction element—to decode the information embedded in the modified decorative label using an optimized decoder of the optimized encoder-decoder pair and to control a virtual and/or physical play experience responsive to the decoded information.

A virtual play experience may include a video game or other computer-implemented or computer-assisted play experience. A computer-assisted physical play experience may include one or more functional toys, e.g. functional toy construction elements, that are controllable by a data processing system to perform one or more user-perceptible functions, e.g. to play sounds, emit light, perform a movement and/or the like.

Hence, the toy system allows the user to interact with the virtual and/or physical play experience by presenting one or more toys—e.g. one or more toy construction elements and/or toy construction models—to the toy system such that the image capturing device captures one or more images of the one or more toys and the processor recognises embedded information in the decorative label and controls the virtual and/or physical play experience responsive to the recognised information. Examples of such control may include unlocking of certain functionality, altering a behaviour of a virtual or of a controllable physical component of the toy system, personalizing a digital experience responsive to a recognised unique toy, and/or the like.

The modified decorative label may be provided as a physical item, e.g. a token or card or other type of physical object, such as a toy e.g. a toy construction element A toy construction element may include coupling members for detachably attaching the toy construction element to other toy construction elements of the toy construction system. Alternatively the physical item may be a physical item different from a toy construction element of the toy construction elements, e.g. a toy or other physical item without coupling members compatible with the toy construction system. The decorative label may also be provided as a part of the wrapping of a toy, e.g. printed on the inside of a container, or otherwise obstructed from access prior to opening the wrapping. The decorative label may e.g. be displayed on a display device, e.g. as a part of a virtual play experience.

For the purpose of the present description, a toy construction model is a coherent structure constructed from two or more toy construction elements. A toy construction element is a single coherent element that cannot be disassembled in a nondestructive manner into smaller toy construction elements of the toy construction system. A toy construction model or toy construction element may be part of a larger structure, e.g. a larger toy construction model, while still being individually recognizable.

Additional features and advantages will be made apparent from the following detailed description of embodiments that proceeds with reference to the accompanying drawings.

BRIEF DESCRIPTION OF THE DRAWINGS

Preferred embodiments of the disclosure will be described in more detail in connection with the appended drawings, where FIG. 1 schematically illustrates a system for creating an optimized encoder-decoder pair.

DETAILED DESCRIPTION

Embodiments of the method and system disclosed herein may be used in connection with a variety of toy objects and, in particular with construction toys that use modular toy construction elements based on dimensional constants, constraints and matches, with various assembly systems like magnets, studs, notches, sleeves, with or without interlocking connection etc. Examples of these systems include but are not limited to the toy constructions system available under the tradename LEGO. For example, U.S. Pat. No. 3,005,282 and USD253711S disclose one such interlocking toy construction system and toy figures, respectively.

Figure 1:
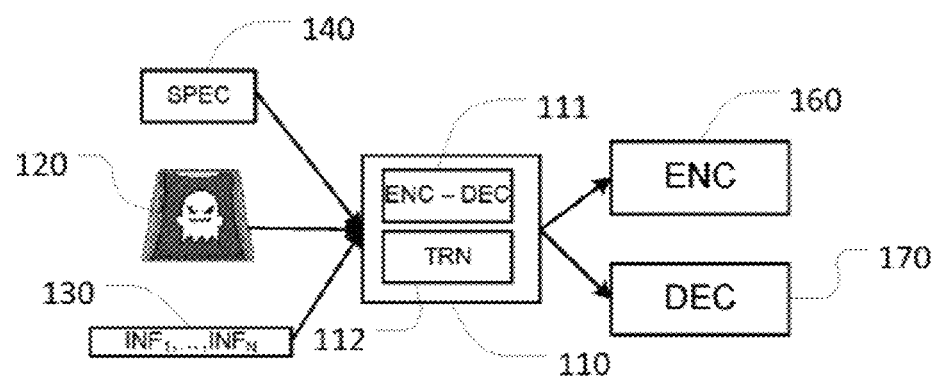

FIG. 1 schematically illustrates a system for creating an optimized encoder-decoder pair. The system comprises a suitably programmed data processing system 110, e.g. a suitably programmed computer or a system including more than one computers.

The data processing system 110 is configured, e.g. programmed, to receive or otherwise obtain a base decorative label 120, a specification of modification rules 140 and a set of items of training information 130. It will be appreciated that the data processing system 110 may receive some or all of the inputs from one or more other data processing systems, e.g. via a suitable data carrier or via suitable data communications interface. For example, the data processing system 110 may receive the base decorative label 110 and the specification of modification rules 140 from a data processing system configured to execute a suitable drawing tool and/or editing tool, which allows a designer to create a decorative label and to specify the specification of modification rules. Alternatively, the data processing system may be programmed to create the decorative label and/or the specification of modification rules itself, e.g. by executing a suitable drawing tool and/or editing tool. Similarly, the training information examples may be created by the data processing system 110 or received from another data processing system.

The base decorative label 120 may be represented in a suitable format. When the base decorative label is received in a vector graphics format, the base decorative label may be obtained directly from any of a large number of conventional drawing tools, or from a modified drawing tool that also provides functionality allowing a user to specify the modification rules. Moreover, as will be described in greater detail below, a vector graphics format allows for a convenient mechanism for specifying the modification rules 140. Examples of known vector graphics formats include the Scalable Vector Graphics (SVG) file format.

Generally, vector graphics representations use geometric primitive objects (also referred to as geometric primitives or simply primitives). Examples of vector graphics primitives include points, lines, curves, and polygons—all of which are based on mathematical expressions—to represent elements of images such as decorative labels. The primitives may be defined by vectors (also called paths or strokes) that lead through control points with a definite position on the x and y axes of a work plane. In addition, each path may be assigned one or more additional properties such as a stroke color, shape, thickness, and fill. Accordingly, the vector graphics primitives have properties, such as a position, a stroke color, a shape, a thickness, etc. These properties describe how the vector graphics should be drawn, e.g. transformed into a bitmap or other rasterized format by a process known as rasterization. Some embodiments of the methods described herein hide information in a decorative label by modifying the geometric primitives of the vector drawing and, in particular by modifying one or more properties of the primitives. Examples of such modifications include a modification of a position, a length or a direction, a modification of a stroke color, a modification of a stroke thickness, and/or the like. For the purpose of the present disclosure, the modifications to the vector graphics primitives performed by the present process will also be referred to as perturbations, as they are preferably small modifications that, preferably, are not readily visible to a cursory observer. When drawing the vector graphics, the perturbed geometric primitives result in a modified raster image, which can be decoded to recover the original information. To preserve the overall layout of the vector drawing the perturbations are constrained to be within bounds as specified by the creator in the modification rules 140.

The information to be embedded may be represented as a bit string or in another suitable format. For the purpose of training the encoder-decoder pair, the training information 130 may e.g. be in the form of a set of random bit strings. In some embodiments, the training information may be automatically generated by the data processing system.

The specification of the modification rules 140 defines bounds and limits on which perturbations to the decorative label are acceptable. The specification may be generated automatically or in a user-assisted or entirely user-controlled manner. For example, the creator of the decorative label or another user may use a suitable editing tool to specify which primitives of the vector graphics representation of the decorative label may be modified and in which limits.

The data processing system 110 is configured to execute a training process 112 configured to train an encoder-decoder pair 111. In particular, the training process trains the encoder of the encoder-decoder pair to embed training information 130 into the base decorative label 120 while observing the modification rules 140, resulting in a modified decorative label. The training process 112 further trains the decoder of the encoder-decoder pair to detect information embedded in a modified decorative label that has been created by the encoder of the encoder-decoder pair.

The training process is an iterative training process configured to adapt both the encoder and the decoder so as to optimize a suitable objective function. The objective function may e.g. include a measure of detection reliability, e.g. of the number of bit errors in the information detected by the decoder compared to the original training information. Alternatively or additionally, the objective function may include other components, e.g. a measure of robustness of the encoder-decoder system against noise or deformations. The encoder and decoder are trained together as a pair, as will be described in greater detail below.

Figure 2:
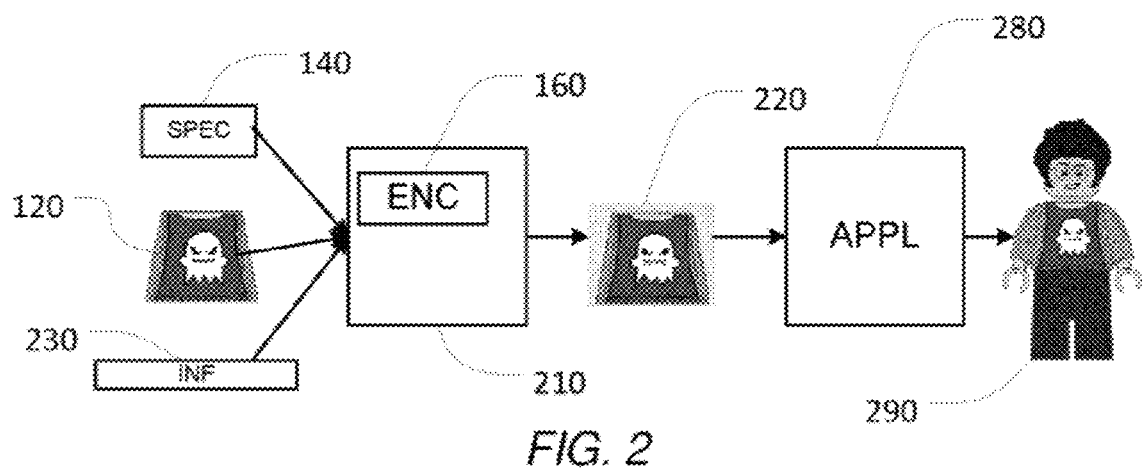
FIG. 2 schematically illustrates a system for embedding information in a decorative label and for applying the decorative label with the embedded information to an object.
Figure 3:
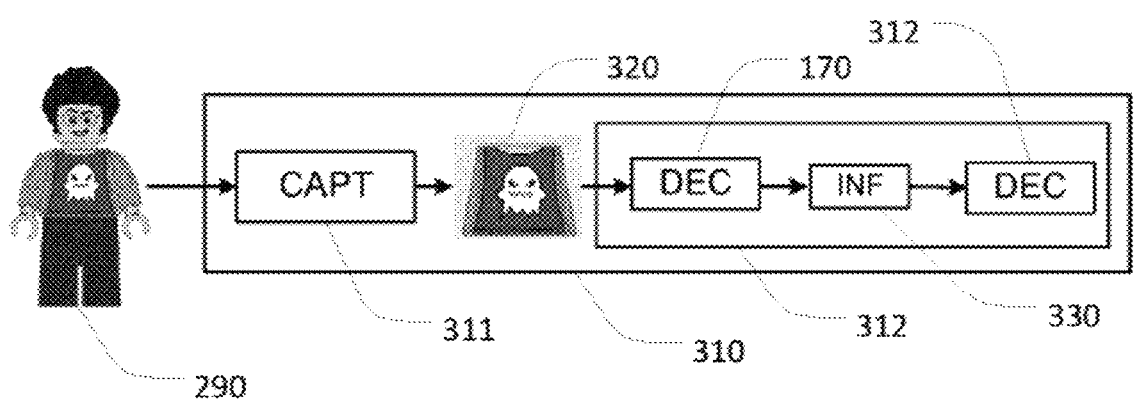
FIG. 3 schematically illustrates a system for detecting information embedded in a decorative label.

The training process results in an optimized encoder-decoder pair including an optimized encoder 160 and an optimized decoder 170 for use, respectively, in the subsequent encoding of information in decorative labels, e.g. by the system of FIG. 2 and for the corresponding decoding of information embedded in decorative labels, e.g. by the system of FIG. 3.

FIG. 2 schematically illustrates a system for embedding information in a decorative label and for applying the decorative label with the embedded information to an object. The system comprises a suitably programmed data processing system 210, e.g. a suitably programmed computer or a system including more than one computers. Data processing system 210 may be the same data processing system as data processing system 110 of FIG. 1 or a different data processing system.

The data processing system 210 is configured, e.g. programmed, to receive or otherwise obtain a base decorative label 120, a specification of modification rules 140 and information 230 to be embedded. The base decorative label and the modification rules are as described in connection with FIG. 1. The information 230 includes the actual information that is to be embedded, e.g. an ID, a hyperlink or any other type of information. The information 230 may be represented as a bit string as described in connection with FIG. 1. The information to be embedded may be one of the training examples used during training of the encoder-decoder system or it may be new information not included in the training examples.

Figure 11:
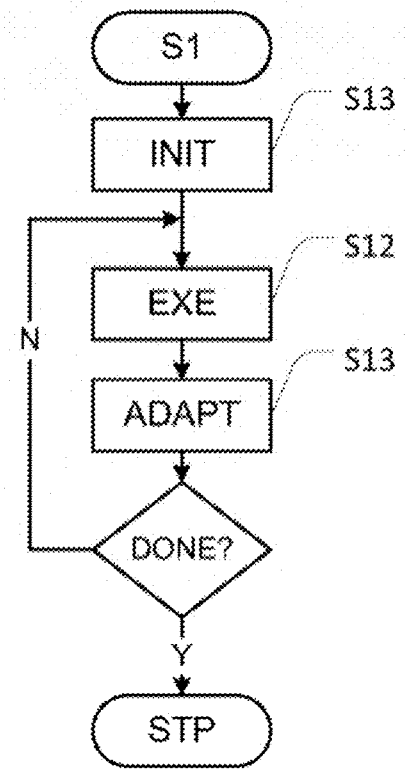
FIG. 11 schematically illustrates an example of a process for creating an encoder-decoder system.

The data processing system 210 executes the optimized encoder 160 of the optimized encoder-decoder pair created by a process as described herein, e.g. by the process of FIG. 11 and/or performed by the system of FIG. 1. The data processing system thus creates a modified decorative label 220 that resembles the base decorative label 120 but that is slightly perturbed in a manner encoding the information 230.

The system further comprises an apparatus 280 for applying the modified decorative label to an object 290, e.g. to a toy, or to otherwise reproduce and/or distribute the modified decorative label. For example, the apparatus 280 may be a printer or another suitable apparatus. It will be appreciated that the modified decorative label may be represented in different ways, e.g. applied to toys, printed on paper, stickers, packages, items of clothing, etc. It will further be appreciated that the modified decorative labels may be distributed in electronic form, e.g. for display on a display or for remote reproduction by printing or the like.

Figure 7:
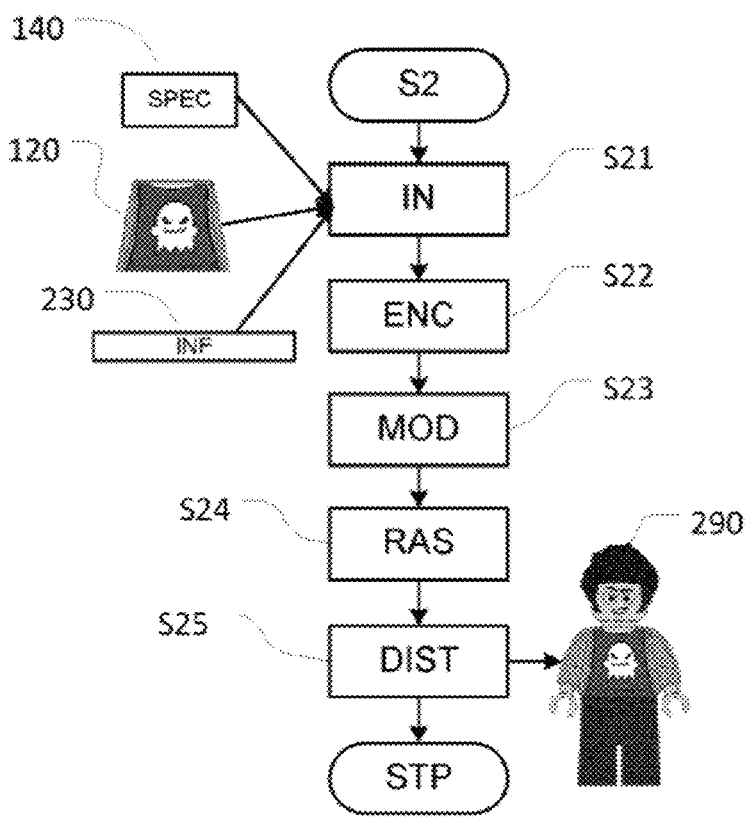
FIG. 7 schematically illustrates an example of a process for embedding information in a decorative label.

FIG. 3 schematically illustrates a system for detecting information embedded in a decorative label, in particular for detecting information embedded by the system of FIG. 2 and/or by the process of FIG. 7.

The system comprises a suitably programmed data processing system 310, e.g. a suitably programmed computer or a system including more than one computers. For example, data processing system 310 may be a portable processing device such as a laptop computer, a tablet computer, a smartphone or the like.

In the example of FIG. 3, the data processing system 310 includes a digital camera 311 or another image capturing device for capturing an image 320 of an object 290 carrying a modified decorative label as described herein, e.g. an object as created by the system of FIG. 2. It will be appreciated that, in other embodiments, the data processing system may receive an image of a decorative label from an external camera or from another source. It will further be appreciated that the data processing system may be configured to process the captured image, e.g. so as to detect the decorative label within the image, to extract and/or rectify, e.g. scale or otherwise transform, the image of the decorative label, or to otherwise process the image so as to bring it into a format suitable as input to the optimized decoder 170 of the optimized encoder-decoder pair described herein, e.g. as created by the system of FIG. 1.

The data processing system 310 is configured to execute the optimized encoder 170 so as to extract the embedded information 330 from the image 320 of the decorative label. Optionally, the data processing system 310 may be configured to execute a further process, e.g. a digital game, social media system, internet browser, or the like, that uses the extracted information 330. Alternatively or additionally, the data processing system 310 may display or otherwise output the extracted information for use by a user or by another process or apparatus.

Figure 4:
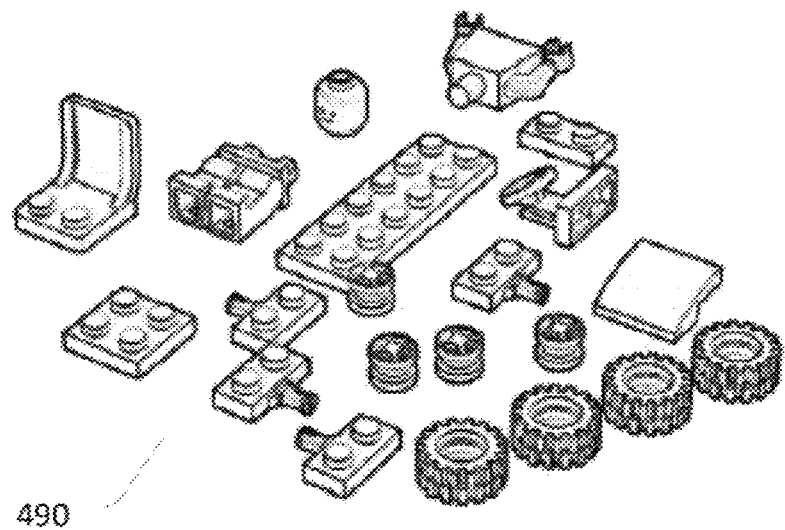
FIG. 4 schematically illustrates an example of a toy system described herein.
Figure 4:
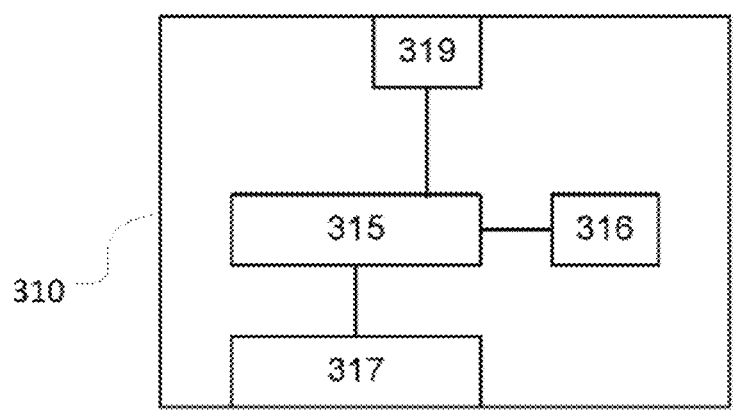

FIG. 4 schematically illustrates an example of a toy system described herein. The toy system includes a plurality of toy construction elements 490 from which one or more toy construction models can be constructed. To this end, the toy construction system may comprise a plurality of conventional toy construction elements. The toy construction system further comprises a toy construction element provided with a decorative label as described herein. Alternatively or additionally, the toy construction system may comprise a modified decorative label in a different form, e.g. printed on a box for accommodating the toy construction elements, printed on a card or token provided with the toy construction system and/or in a different manner.

The modified decorative label has information embedded in it that pertains to the toy construction system, e.g. to the toy construction model or models constructible to from the toy construction elements. For example, the information may include a toy ID, an unlock code, and/or the like. For example, an unlock code may be for unlocking a virtual object associated with the respective toy construction model, e.g. a virtual character and a virtual car, respectively.

The toy system further comprises a suitably programmed processing device 310, e.g. a tablet or smartphone or other portable computing device executing an app that implements a digital game of the toy system, such as described with reference to FIG. 3. In such an embodiment, the processing device 310 comprises a central processing unit 315, a memory 316, a user interface 317 and an image capture device 319.

The user interface 317 may e.g. include a display, such as a touch screen, and, optionally input devices such as buttons, a touch pad, a pointing device, etc.

The image capture device 319 may include a digital camera, a depth camera, a stereo camera, and/or the like.

The processing device 310 may be programmed to detect information embedded in the decorative label 320, e.g. as described in connection with FIG. 3 and as further described below.

Figure 5:
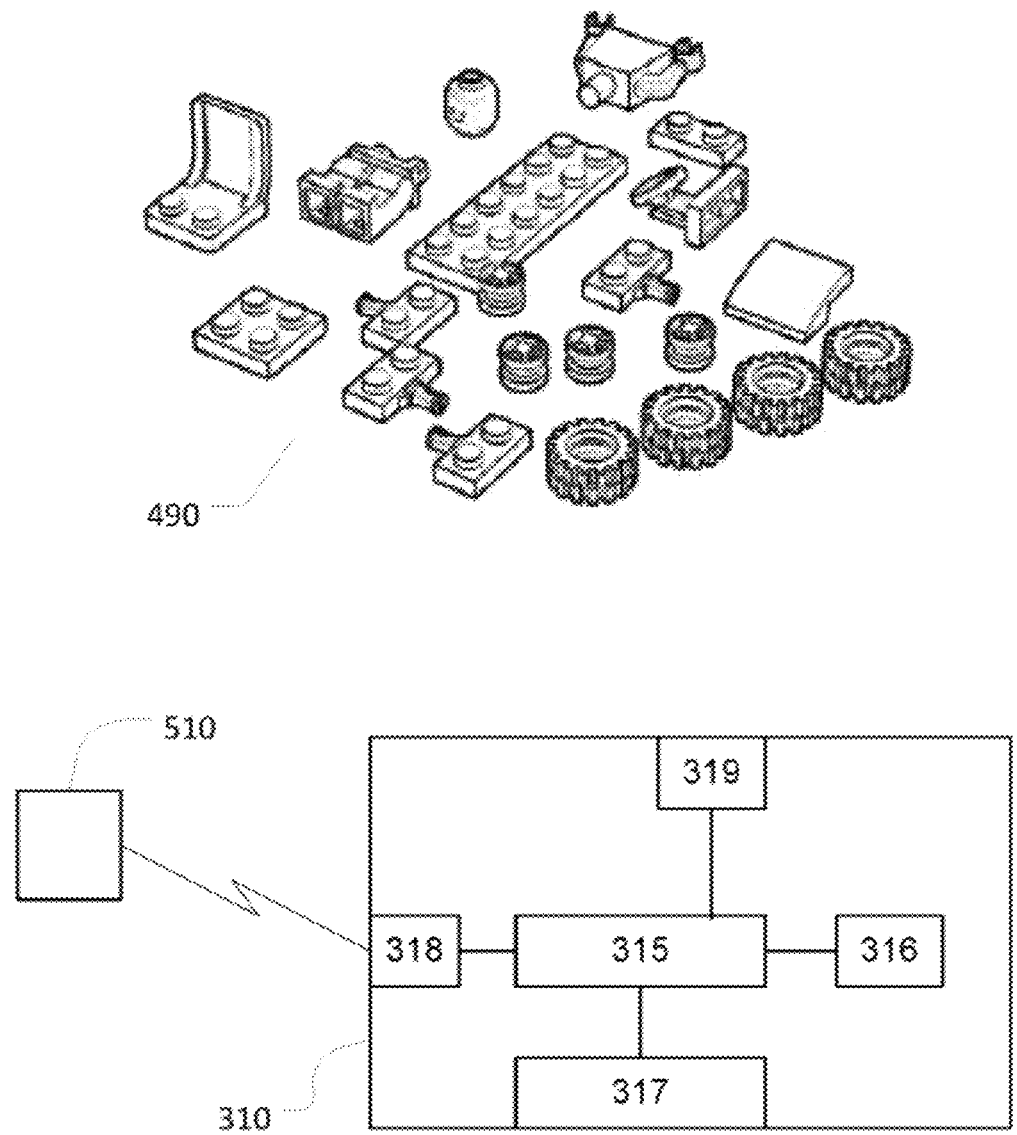
FIG. 5 schematically illustrates another example of a toy system described herein.

FIG. 5 schematically illustrates another example of a toy system described herein. The toy system of FIG. 5 is similar to the toy system described with reference to FIG. 4, the only difference being that the processing device 310 further comprises a communications interface 318, such as a wireless or wired communications interface allowing the processing device 310 to communicate with a remote system 510. The communication may be wired or wireless. The communication may be via a communication network. The remote system may be a server computer or other suitable data processing system, which may be configured to implement one or more of the processing steps described herein. For example, the remote system may maintain a database of unlock codes in order to determine whether a given unlock code has previously been used to unlock a virtual object. Yet alternatively or additionally, the remote system may implement the decoder or parts thereof, e.g. for recognizing toy construction models in captured images or for decoding the information from an image of the toy construction model including a modified decorative label. Yet alternatively or additionally, the remote system may implement at least a part of a digital game, e.g. in embodiments where the digital game includes a multiplayer play experience or a networked play experience.

Figure 6:
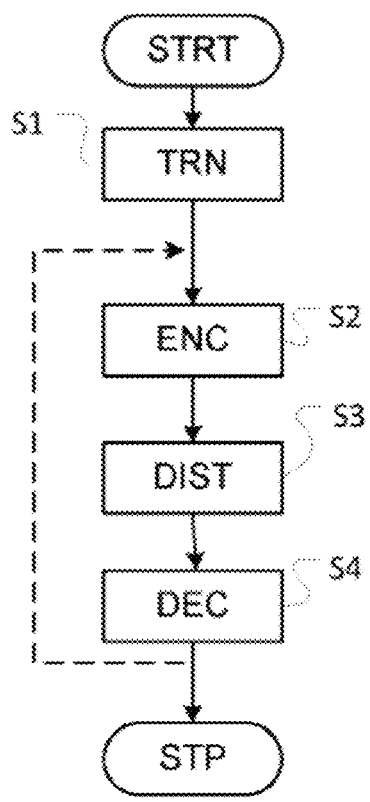
FIG. 6 schematically illustrates an example of a process for embedding and detecting information in a decorative label.

FIG. 6 schematically illustrates an example of a process for embedding and detecting information in a decorative label. In step S1 the process creates an optimized encoder-decoder system. In step S2, the process uses the optimized encoder of the optimized encoder-decoder system to embed information in a decorative label. This step results in a modified decorative label. In step S3, the process distributes the modified decorative label, e.g. to a user. In step S4, the process uses the optimized decoder of the optimized encode-decoder pair to detect the information embedded in the modified decorative label. It will be appreciated that steps S2 through S4 may be repeated multiple times, in particular so as to embed and subsequently retrieve different information embedded in respective modified versions of the decorative label. Embodiments of the steps S1, S2 and S4 of this overall process will be described in greater detail below.

FIG. 7 shows a flow diagram of an example of a computer-implemented process for embedding information in a decorative label, in particular an example of step S2 of the process of FIG. 6. The process of FIG. 7 may e.g. be performed by the system of FIG. 2. In particular, the process may be executed by a suitably programmed data processing system.

In Initial step S21, the process receives a base decorative label 120, a specification of modification rules 140 and the information 230 to be embedded, all as described in connection with FIG. 2. In particular, the information to be embedded may be represented as a bit string or in another suitable way.

The base decorative label is represented as a vector graphics drawing, i.e. by a plurality of geometrical primitives such as points, lines, curves, and polygons, also as described in connection with FIG. 2. In one particular embodiment, the vector graphics representation is a scalable vector graphics (SVG) format. The plurality of geometrical primitives may be represented as a sorted set of primitives (e.g. lines, circles, etc.) and groups, in particular nested groups, of primitives.

Each primitive may be described by its type and one or more properties. The properties may be defined by a set of continuous variables and a set of discrete variables.

The discrete variables may hold information such as the appearance of line caps (e.g. rounded or flat). Examples of continuous variables include endpoint coordinates, line thickness, color and opacity of a straight line. Other examples of continuous variables include center point coordinates and radius of a circle. It will be appreciated that, even though continuous variables are typically represented by variables having a finite precision, they represent quantities that can be modified on a continuous scale. Preferably, the encoder modifies properties represented by continuous variables, so as to allow definition of a differentiable optimization function for optimizing the encoder function.

Groups of primitives may be subject to transformations, such as scaling and rotation and translation which may also be represented as continuous variables. The encoder function may thus also modify transformations, such as scaling and rotation and translation which may also be represented as continuous variables.

In order to encode information in a base decorative label that is represented as a vector graphics drawing, d, some of these variables are varied, based on the specification of a set of modification rules, in the following also referred to as encoder specification, $s_e$. The encoder specification specifies the type and extent of the modifications the encoder may apply to the base drawing. Typically, the choice of modification rules $s_o$ will be based on artistic/aesthetic considerations. To this end, the modification rules may be based on user input.

For example, a base decorative label may include two lines, designated Line_1 and Line_2, respectively, and a group of primitives designated Group_1. In this example, examples of associated modification rules may include the following modification rules:

The endpoints of Line_1 may move independently from each other within a radius of 0.5 units. This modification rule allows for 2×2=4 variables to be modified.

Line_2 may be rotated around a fixed center point (0.3, 0.6) by up to 10°. This modification allows for 1 variable to be modified.

Group_1 may be rotated by up to 5° and scaled within the range [0.9. 1.1]. This modification rule allows for 2 variables to be modified.

Hence, the above examples of modification rules allow for seven variables to be modified in total. It will be appreciated that different decorative labels will generally include different numbers and different types of primitives. Moreover, for each decorative label different sets of modification rules may be defined, thus allowing different numbers of variables to be modified for any given decorative label. It will further be appreciated that more or less complicated modification rules may be defined, e.g. including modification rules that impose dependencies of one modification on another modification.

Figure 8:
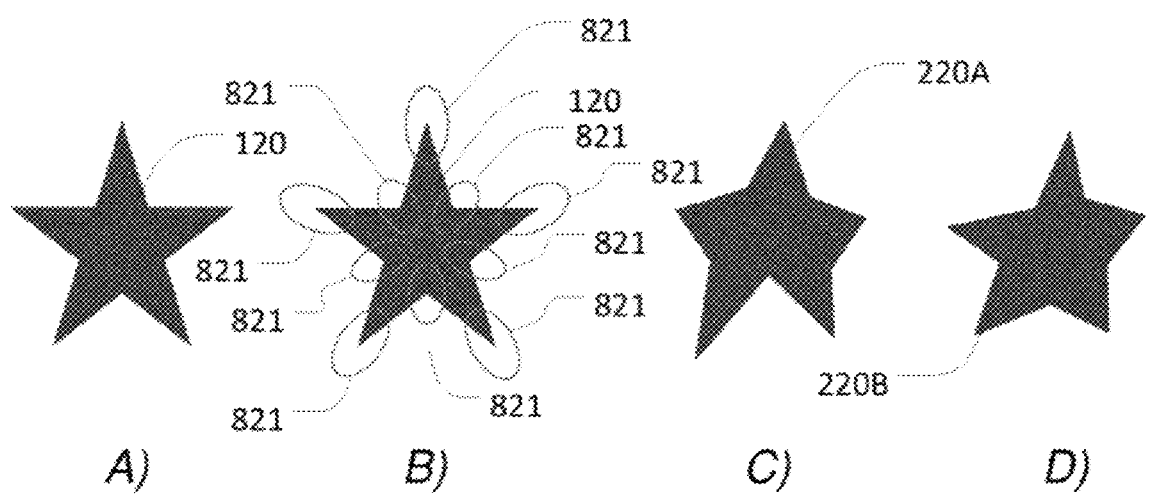
FIG. 8 schematically illustrates an example of modified decorative labels having information embedded therein.

FIG. 8 illustrates a simple example of a decorative label and of possible modifications. In particular FIG. 8 includes sub-drawings designated FIG. 8 A) through FIG. 8 D). FIG. 8 A) shows an example of a decorative label 120 in the form of a star. The decorative label is represented by a set of lines that together define the outline of the star. Each line has two opposing end points. FIG. 8 B) illustrates the decorative label 120 with the end points highlighted by loops 821. In one example, the modification rules may define that each of the end points may independently be moved by the encoder such that the displacement does not exceed a predetermined upper limit. FIGS. 8 C) and 8 D) illustrate resulting modified decorative drawings where at least some of the end points have been displaced.

For most decorative labels, slight changes in the parameters do not significantly alter the artistic expression and are often barely noticeable. Embodiments of the present method exploit this fact to encode a bit string in a given decorative label by perturbing the parameters within predefined bounds, which may be specified on a perprimitive and/or per-group basis. The result of a perturbation within the predefined bounds is a modification of the base decorative label defined by a number of variables, m, defining the parameter perturbations, each subject to the predefined bounds. Different embodiments may support different subsets of the available SVG primitives. For example, one embodiment may support only lines, paths (linear and circular segments), circles, half-circles, triangles and polygons. Other embodiments may support additional and/or alternative primitives. Parameter perturbations may be defined at group-level (affine transformations) or at primitive-level (affine transformations and per-point translation). In some embodiments, the base decorative label and the modification rules may be represented in separate or in a combined file format, e.g. In an SVG-inspired format in Python, in order to accommodate the extra functionality for specifying the free variables and their constraints. Some embodiments of the process may be restricted to producing black-and-white decorative labels while other embodiments allow the production of colored decorative labels.

Again referring to FIG. 7, in subsequent step S22, the process applies an encoder function to determine a modification of the base decorative label which, when applied to the received base decorative label embeds the received information into the base decorative label while adhering to the received modification rules, in particular, the encoder function is an optimized encoder function of an optimized encoder-decoder pair as described herein, e.g. as created by the process of FIG. 11 and/or by the system of FIG. 1.

In order to encode n bits of information x in a vector drawing with m variables, an encoder function $f$ is applied to the information x, where the encoder function adheres to the encoder specification $s_o$:

$$f(x;s_o): \mathbb{Z}_2^n \to \mathbb{R}^m$$

In some embodiments, $f$ consists of a linear matrix-vector operation, followed by a sigmoid nonlinearity and s scaling:

$v_x = f(x; s_a) = h(\sigma(Ax); s_o)$ where $A \in \mathbb{R}^{m \times n}$, $\sigma(x) = e^x/(e^x+1)$ and where h is a fixed function which scales and shifts each value according to the bounds given in the encoder specification. In particular, the encoder function is parametrized by the matrix elements of A. Optimized values of these have been determined during the creation of the optimized encoder function as described herein.

In step S23, the result of applying the encoder function $f$ to the information x is then used to modify the base drawing d representing the base decorative label. This results in a modified vector drawing $d_r$ that has the information x embedded therein.

It will be appreciated that other embodiments may use other encoder functions $f$, in particular another differentiable function, capable of uniquely mapping $Z_2^n$ to $R^m$. Accordingly different information may be embedded in a decorative label, thus resulting in respective modified decorative labels.

Figure 9:
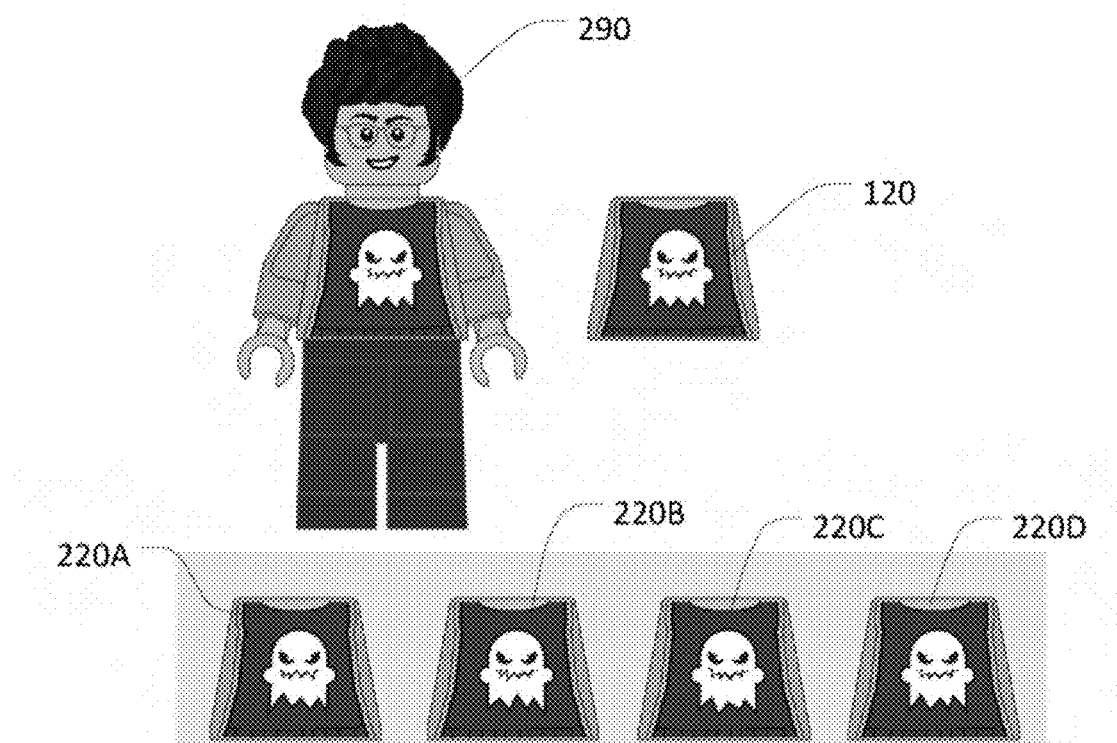
FIG. 9 schematically illustrates another example of modified decorative labels having information embedded therein.

FIG. 9 schematically illustrates an example of a decorative label 120 that may be applied to a toy 290. FIG. 9 further illustrates different modified decorative labels 220A-D, respectively, having different items of information embedded in it.

Again referring to FIG. 7, the output of step S23 is a vector graphics representation of the modified decorative label. In subsequent step S24, the process applies a rasterization step so as to transform the vector graphics representation of the modified decorative label into a raster representation of the modified decorative label. e.g. a bitmap format. Examples of suitable raster formats include jpg, gif, png, tif, bmp, psd, eps and/or the like. The rasterization may be performed using known methods for transforming vector graphics drawings into raster format.

In subsequent step S25, the raster format of the modified decorative label is reproduced and/or distributed for its intended purpose. For example, the process may print the modified decorative label on a physical object 290, e.g. a toy, or the process may otherwise distribute the decorative label.

Generally, embodiments of the encoder and associated modification rules described herein may be used to generate modified decorative labels from bit strings. The encoder and associated modification rules may be kept secret by the issuer of the modified decorative labels.

Figure 10:
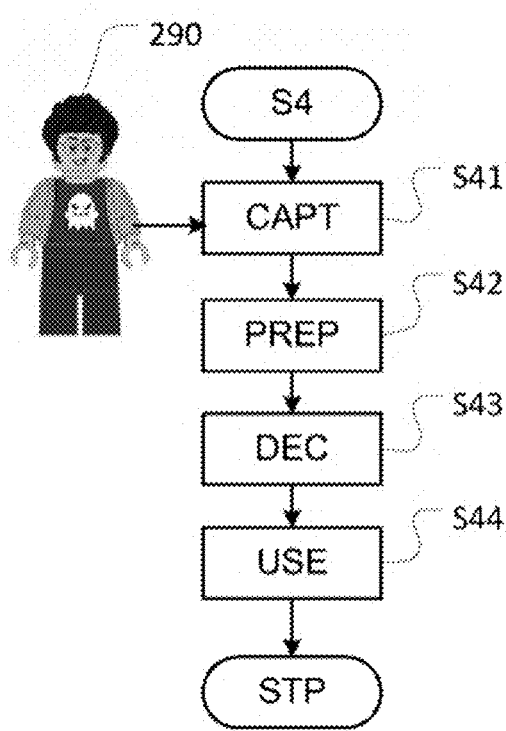
FIG. 10 schematically illustrates an example of a process for detecting information embedded in a decorative label.

FIG. 10 shows a flow diagram of an example of a computer-implemented process for detecting information embedded in a decorative label, in particular in a modified decorative label, modified by a process for embedding information in a decorative label as described herein, e.g. by the process of FIG. 7. The process of FIG. 10 thus represents an embodiment of step S4 of the overall process of FIG. 6. The process of FIG. 7 may e.g. be performed by the system of FIG. 3. In particular, the process may be executed by a suitably programmed data processing system, such as on a portable processing device, e.g. a tablet computer, a laptop computer or a smartphone.

In initial step S41, the process captures, receives or otherwise obtains an image of an object 290 carrying a modified decorative label as described herein. For example, the image may be an image captured by a digital camera of the device executing the process. The image may directly be forwarded from the camera to the recognition process. To this end, the process may instruct the user to capture an image of a toy construction model constructed by the user or of another object carrying a modified decorative label. In some embodiments, the process may initially display or otherwise present building instructions instructing the user to construct a predetermined toy construction model. The process may receive a single captured image or a plurality of images, such as a video stream, e.g. a live video stream currently being captured by the camera.

Optionally, in subsequent step S42, the captured image may be preprocessed, in particular processed so as to correct for the spatial distortions that result from variation in camera position and rotation. To this end, process may apply computer vision techniques to detect and rectify the received image before decoding it, e.g. for performing one or more of the following: object detection, pose detection, cutout preprocessing.

In some embodiments, the process applies conventional computer vision techniques to rectify the received image by locating predefined key points in the image (e.g., using the Scale-Invariant Feature Transform (SIFT) and by subsequently estimating and applying a suitable perspective transform. Further, if the intrinsic parameters of the camera are known in advance, and if the physical 3D position of each key point on the object being imaged is also known, the rotation and translation (i.e. extrinsic parameters) of the camera can also be determined, thereby enabling the use of the encoded image as a marker for augmented reality applications.

In some embodiments, the process applies a Single shot multibox detector, e.g. as described in Wei Liu, Dragomir Anguelov, Dumitru Erhan, Christian Szegedy, Scott Reed, Cheng-Yang Fu, and Alexander C Berg. Ssd: Single shot multibox detector. In European conference on computer vision, pages 21-37. Springer, 2016. Applying a single shot multibox detector provides a fast process that can be optimized for use on portable processing devices. Moreover, while alternative techniques may be used as well, use of a single shot multibox detector has been found to provide good results in embodiments of the present process, even where the decorative label itself has been subject to perturbations due to the encoding process.

In order to compute the pose of the decorative label, a number of imperturbable markers may be selected in the drawing. A second convolutional neural network may then estimate a heatmap for each of these markers in a cutout as estimated by the object detector, and a soft-argmax operation may compute the marker's position with sub-pixel accuracy. This operation can be relatively computationally expensive, but the subpixel accuracy means that it can be performed in smaller scale. Some embodiments of the process use an iterative PnP solver with respect to the known imperturbable markers to retrieve the graphic's rotation and translation vectors by reducing the sum of squared distances.

With the cutout aligned to closely resemble its original vector graphic orientation, the process may further perform a series of preprocessing operations to prepare it for decoding. Firstly, the cutout may be blurred, e.g. using a standard Gauss kernel, such as a kernel of size 3×3 pixels and sigma 0.95. This blurred image may be thresholded, e.g. using Otsu's thresholding (see e.g. N. Otsu. A threshold selection method from gray-level histograms. IEEE Transactions on Systems, Man, and Cybernetics, 9(1):62-66, 1979), thus creating a binary representation of the graphic. A predefined mask which coarsely surrounds the graphic may be used to selectively threshold outside values as well.

The resulting sharply edged binary representation may yet again be blurred, e.g. using the same Gaussian kernel described earlier, before being fed to the bit string decoder network.

In some embodiments, steps S42 and S43 may be combined into a single step, e.g. performed by a single neural network.

In step S43 the captured and, optionally, preprocessed image is fed into a decoder, in particular an optimized decoder of an optimized encoder-decoder pair obtained by the process for creating an encoder-decoder system as described herein, e.g. the process of FIG. 11 and/or performed by the system of FIG. 1.

The decoder is a parametrized function g(img; w) of an input image img having encoded some information. The function g is parametrized by a set of parameters w. In embodiments where the function g is or includes a neural network, the set of parameters w may include a set of weights of the neural network. The image img may be represented in a suitable manner, e.g. as a matrix of image pixels, e.g. image pixel representing a pixel color and/or other image information. The function g may output n continuous predictions, r which may be in the range (0; 1).

The decoder may be implemented as a neural network, in particular a convolutional neural network. The neural network takes as the input an image, img, and outputs n predictions, j which may be in the range (0; 1). In a post-processing step, these outputs are binarized, using a threshold, resulting in an output bit string estimate 2.

In the present embodiment, the decoder comprises a convolutional neural network (CNN) with fully connected output layers (FC), a set of weights w, and sigmoid activation, $\sigma(\ )$:

$$\tilde{x} = g(img; w) = \sigma(FC(CNN(img)))$$

$$\hat{x} = \text{threshold}(\tilde{x}).$$

Optionally, in subsequent step S44, the process uses the decoded information, e.g. to unlock features in a digital game, to retrieve further information identified by the decoded information, etc. In some embodiments, the process merely outputs the decoded information, e.g. by displaying it to a user or by providing it to another process or system.

Generally, embodiments of the optimized decoder of the encoder-decoder system described herein, do not explicitly contain the information required to produce new decorative labels with a specific ID. Accordingly, the decoder may be made directly available to end-users or indirectly available, e.g. over the internet or otherwise. For example, the decoder may be made available via an API.

FIG. 11 schematically illustrates an example of a process for creating an encoder-decoder system, in particular an example of step S1 of FIG. 6. The process of FIG. 11 may e.g. be performed by the system of FIG. 1.

The process of FIG. 11 optimizes the parameters of a parametrized encoder-decoder system based on a set of training examples. The trainable elements of the encoder-decoder system are the encoder function $f$ and the decoder function g. During training, the encoder learns to make modifications to the decorative label which are decodable by the decoder, and the decoder learns to produce bit string estimates, z, which are as reliable as possible, i.e. the encoder-decoder pipeline is optimized end-to-end.

Accordingly, in step S13, the process receives its input, in particular a base decorative label into which information is to be embedded. The process further receives, or generates, a training set of items of training information to be embedded into the base drawing. Moreover, the process receives modification rules, also referred to as encoder specification $s_e$. The process initializes the encoder function $f$ and the decoder function g of the encoder-decoder system with an initial set of parameters, e.g. with an initial set of network weights of the neural network implementing g and the corresponding network weights of a matrix A defining a linear neural network representing $f$, e.g. as described in connection with FIG. 6 above. For example, the parameters, in particular the network weights, of $f$ and g may be initialized to random values.

Figure 12:
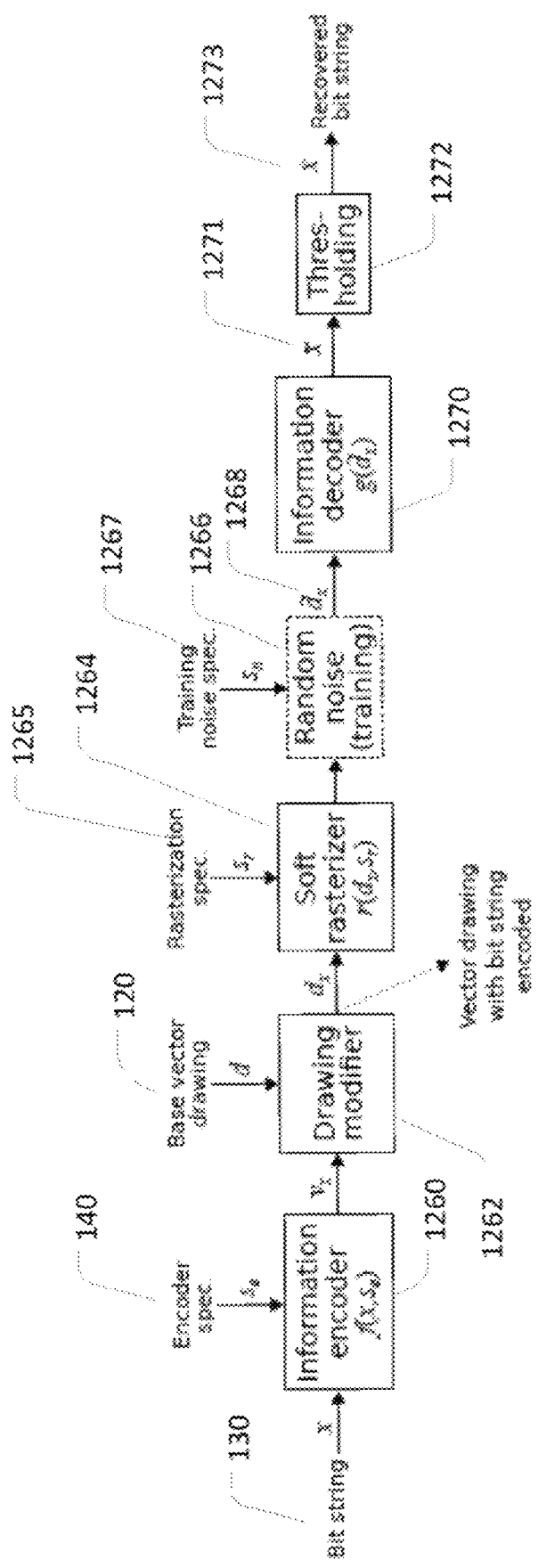
FIG. 12 schematically illustrates an example of a process for embedding and detecting information in a decorative label during training of an encoder-decoder system.

In step S12, the process performs an encoding and decoding sequence for one or more of the items of training information, e.g. by performing the steps of the process of FIG. 12. The process further compares the resulting decoded information with the original item of training information. The comparison may include the computation of a suitable error measure or other objective function, e.g. based on a suitable distance function between the items of training information and the corresponding resulting decoded information.

Based on the comparison, in step S13, the process adapts the parameters of the encoder and the decoder. The training process and, in particular, the adaptation of the parameters, may e.g. use a machine learning training scheme known per se in the art, e.g. using backpropagation training or another suitable method. When using backpropagation, all elements in the pipeline for transforming x into f should preferably be differentiable. It will further be appreciated that other embodiments of the training process may use other types of training including embodiments, where steps S12 and S13 are combined.

Steps S12 and S13 are repeated until a termination criterion is fulfilled, e.g. until an error measure is below a predetermined threshold. In one embodiment, the process uses a binary cross-entropy loss function on the n elements of 9. Other examples may use an error measure indicative of an average number of bit errors for the respective items of training information The inventors have realized that training the pipeline may be slow and prone to divergence. This may be solved by applying a two-stage training schedule. In a first stage, the encoder parameters are locked at their randomly initialized state, and the decoder is trained until performance plateaus, e.g. until the rate of improvement of the objective function falls below a predetermined threshold. Then, in a second stage, the encoder weights are unlocked, i.e. allowed to be adapted by the process, and the system is trained end-to-end, i.e. by adapting the parameters of the decoder as well as the encoder.

FIG. 12 schematically illustrates an example of a process for embedding and detecting information in a decorative label during training of an encoder-decoder system. The process receives a bit string 130, designated x, representing an item of training information.

In step 1260, the process applies the current encoder function $f(x; s_o)$ which computes a modification $v_x$ to the decorative label while adhering to the modification rules defined by the encoder specification $s_o$, all as described in connection with the encoding process of FIG. 6. For the purpose of simplifying the notation in FIG. 12, the parameters A have been omitted from the notation of the encoder function f. In step 1262, the process applies the computed modification to the base drawing d, which represents the decorative label used for training the encoder-decoder system, thus resulting in a modified drawing $d_x$ representing a modified decorative label having the information x embedded in it. The base drawing and the modified drawing are represented as vector graphics, also as described in connection with FIG. 2.

Accordingly, as discussed earlier, the modified drawing is rasterized to make it suitable for printing, display and other reproduction/distribution purposes.

During subsequent use of the trained encoder, a conventional rasterization may be used that results in a high-quality rastered drawing suitable for printing and other forms of reproduction.

However, such rasterization is generally not differentiable. Therefore, in order to facilitate end-to-end training of the entire pipeline and in order to obtain a robust encoder/decoder combination, preferred embodiments of the training process employ a smoothed, differentiable rasterization, which also be referred to herein as "soft" rasterization engine. The soft rasterization engine 1264 link the encoder output, $v_x$, of the encoder with the decoder input.

This rasterization engine 1264 is capable of rendering the 2D vector graphics in a form, which closely resembles the "hard" output of a conventional non-differentiable vector graphics rasterizer, while at the same time allowing gradient flow between the encoder and decoder. The rasterization process may be configured by a number of rasterization parameters specified in a rasterization specification data structure 1265.

Figure 13:
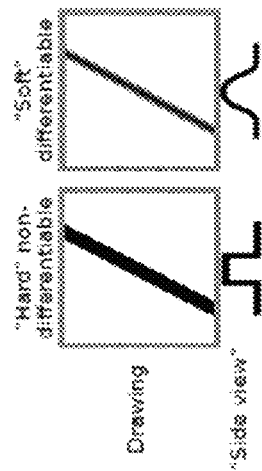
FIG. 13 schematically illustrates an example of a soft rasterization of a vector graphics drawing.

FIG. 13 schematically illustrates the difference between "hard" and "soft" rasterization. The illustrated "side view" can be intuitively visualized as the thickness of the ink, when looking at the drawing from the side, along the line.

In some embodiments, the soft rasterizer may be implemented using a combination of signed distance functions (e.g. a smooth function dist(x; y) that is positive for image points outside the line and negative for points inside) and a nonlinearity (e.g. a sigmoid function).

An example of a black-and-white soft rasterization process is as follows: Each primitive has an associated differentiable signed distance function (SDF), which is positive in the interior of the primitive, zero on the border and negative outside. By computing each SDF over a pixel grid and applying a Sigmoid function with a sharpening parameters, each primitive is rendered in a differentiable manner, yielding L rasterizations, $(r_0; r_1; \ldots ; r_{L-1})$. To form the final image, l, the rasterized primitives combined on a zero-valued (white) canvas in an additive fashion, with black- and white-colored primitives represented by positive and negative values, respectively, and the result is squashed to the range [0; 1]:

$$I = \text{squash}_{[0:1]}\left(\sum_{i=0}^{L-1} c \cdot \sigma(sr_i)\right)$$

where $$c = \begin{cases} -1 & \text{for white - colored primitives} \\ +1 & \text{for black-colored primitives} \end{cases}$$

and where $$\text{squash}_{[0;1]}(x) = \sigma[t(x-0.5)]$$

with t being a sharpening parameter.

This approach does not support layering. For example, adding a white line on top of two overlapping black lines yields a black line, i.e. B+B+W=1+1−1=1(black), where B=1 and W=−1 represent the black and white features, respectively. To mitigate this, bottom-up layering may be enabled by the use of intermediate squashing functions, e.g.: $\text{squash}_{[0;1]}(B+B)+W=B+W=0$ (white).

It will be appreciated that the soft rasterizer is only applied as during the training process. During subsequent use of the trained encoder, a conventional rasterizer, in particular a non-differentiable rasterizer may be used.

Again referring to FIG. 12, in subsequent step 1266, the training process further modifies the image/generated by the soft rasterizer 1264. In particular, to add robustness to the various artifacts, which may be introduced by real-world cameras, the process adds random augmentation to the images between the rasterizer and the decoder. The skilled person will appreciate that, in contrast to a more conventional setting, where the augmentation is applied before the input stage of the network, it is preferred in connection with the present process that the augmentations applied by the process are differentiable with respect to the image. Specifically, the process may apply spatial transforms (perspective, scaling, rotation, translation) and/or pixel intensity noise (scaling, offset, Gaussian noise and/or salt-and-pepper noise). It will be appreciated that other embodiments of the process may apply alternative and/or additional forms of noise, such as blurring. The type and/or amount of noise may be defined by a suitable training noise specification 1267.

The resulting image thus represents the modified decorative label 1268, denoted $\tilde{d}_x$, having encoded therein an item x of training information, wherein the image is in a smoothened (or "soft") raster format with additional differentiable augmentations to introduce noise.

During subsequent step 1270, the resulting image is fed into the decoder function g which computes n continuous bit estimates $\tilde{x}$ 1271. For the purpose of simplifying the notation in FIG. 12, the parameters w have been omitted from the notation of the decoder function g. The process may finally apply a thresholding function 1272 to obtain the estimated bit string $\hat{x}$ 1273. A performance measure of the current encoder-decoder pair may thus be determined by comparing the training bit string x with $\tilde{x}$ and/or with $\hat{x}$.

Although the disclosure has been described with reference to certain specific embodiments, various modifications thereof will be apparent to those skilled in art without departing from the spirit and scope of the disclosure as outlined in claims appended hereto.

What is claimed is:

1. A computer-implemented method for creating an encoder-decoder system for embedding information in a label, the method comprising:
   receiving an encoder specification indicative of one or more modification rules, each modification rule defining a type and/or magnitude of a modification to the label;
   defining a family of encoder functions and a family of decoder functions, each encoder function of the family of encoder functions configured to encode information as a respective modification of a label, each decoder function of the family of decoder functions configured to decode an image of a modified label into respective decoded information; and
   applying an iterative optimization process to determine an optimized encoder-decoder pair, the optimized encoder-decoder pair comprising an optimized encoder function and an optimized decoder function, the optimized encoder function selected by the iterative optimization process from the family of encoder functions and the optimized decoder function selected by the iterative optimization process from the family of decoder functions, the iterative optimization process being configured to determine the optimized encoder-decoder pair so as to at least approximately optimize a detection reliability of the optimized decoder function when decoding images of labels that have been modified using the optimized encoder function,
   wherein:
   each encoder function of the family of encoder functions is configured to receive a vector graphics representation of the label and to output a modification of the vector graphics representation;
   wherein the family of encoder functions is a parametric family of encoder functions, parametrized by one or more adaptable encoder parameters; wherein the family of decoder functions is a parametric family of decoder functions, parametrized by one or more adaptable decoder parameters, and wherein the iterative optimization process comprises iteratively adapting the one or more encoder parameters and the one or more decoder parameters;
   wherein the vector graphics representation includes a plurality of vector graphic primitives, each primitive having one or more properties; and wherein the modification of the vector graphics representation includes a modification of one or more of the primitives; and
   wherein the method comprises receiving an encoder specification indicative of one or more modification rules, each modification rule being specific to a particular label and defining a type and/or magnitude of a modification to specific primitives of the label.

2. A method according to claim 1, wherein the optimized encoder-decoder pair is determined using a machine-learning process based on a set of training examples, each training example including a training label and training information to be embedded in the training label.

3. A method according to claim 2, wherein the family of decoder functions is defined as a neural network, in particular as a convolutional neural network, parametrized by a plurality of adaptable network weights.

4. A method according to claim 2, wherein applying the modification to a label during use of the optimized encoder function comprises a rasterization of the modified vector graphics representation resulting in rasterized version of the modified vector graphics representation, and wherein the optimization process is configured to apply a differentiable approximation of said rasterization process resulting in a smoothed rasterized version of the modified vector graphics representation.

5. A method according to claim 1, wherein the iterative optimization process comprises a first optimization stage and a second optimization stage, wherein, during the first optimization stage, the encoder parameters are kept constant, and only the decoder parameters are adapted according to an optimization update rule responsive to a suitable error measure, and wherein, during the second optimization stage, the encoder parameters and the: decoder parameters are adapted according to the same or a different optimization update rule.

6. A method according to claim 1, wherein:
   the encoder-decoder pair is optimized for use with one or more particular user-defined labels, and
   the set of training examples comprises the one or more user-defined labels, one or more corresponding encoder specifications, each indicative of one or more modification rules specific to a respective one of the one or more user-defined labels, and a plurality of items of training information to be embedded in the one or more user-defined labels.

7. A method according to claim 6, wherein the set of training examples comprises only a single user-defined label.

8. A method according to claim 1, wherein:
   the vector graphics representation of the label comprises one or more geometric primitives, each geometric primitive having one or more associated properties, and
   each encoder function of the family of encoder functions is configured to compute the modification of the vector graphics representation as a set of modifications of respective values of one or more of said properties, the set of modifications encoding said information.

9. A method according to claim 8, wherein:
   said properties are represented by respective continuous variables, and
   each encoder function of the family of encoder functions is configured to compute the modification of the vector graphics representation as a set of modifications of respective values of one or more of said continuous variables, the set of modifications encoding said information.

10. A method according to claim 1, further comprising:
a) receiving a label and at least one item of information to be embedded into said label,
b) using the optimized encoder function to encode the received item of information as a modification of the received label, and
c) applying the modification to the received label to obtain a modified label.

11. A method according to claim 10, wherein the label is a user-defined label and the encoder-decoder system is optimized for the particular user-defined label.

12. A method according to claim 1, further comprising:
a) obtaining one or more images of respective modified labels, and
b) applying the optimized decoder function to decode each of the obtained images of the respective modified labels into respective decoded information.

13. A method for embedding information in a label, the method comprising the steps of: obtaining, by a data processing system executed on a computer processor, the label in a vector graphics format having geometric primitives, receiving, by the data processing system, modification rules defining metes and bounds of acceptable alterations to the label, and executing, by the data processing system, a training process configured to train an encoder to embed information into the label by altering the geometric primitives of the label while observing the modification rules to form a modified label, the training process also configured to train a decoder to detect the information embedded in the modified label, the training process configured to iteratively adapt both the encoder and decoder for optimization; wherein the vector graphics representation includes a plurality of vector graphic primitives, each primitive having one or more properties; and wherein the modification of the vector graphics representation includes a modification of one or more of the primitives, wherein the method comprises receiving an encoder specification indicative of one or more modification rules, each modification rule being specific to a particular label and defining a type and/or magnitude of a modification to specific primitives of the label.

14. The method according to claim 13, further comprising the step of executing the encoder, once trained, to embed information in a label.

15. The method according to claim 13, further comprising the step of executing the decoder, once trained, to detect information embedded in a label.

16. A method for modifying a virtual label, the method comprising the steps of:
providing, to a data processing system, a base virtual label represented as a vector graphics drawing, modification rules, and information to embed in the base virtual label;
applying, using an encoder executed by the data processing system, an encoder function to the base virtual label while adhering to the modification rules to obtain modification specifications; and
modifying, using the data processing system, the base virtual label based on the modification specification to retrieve a modified virtual label.

* * * * *